United States Patent [19] [11] Patent Number: 5,250,761
Koyanagi [45] Date of Patent: Oct. 5, 1993

[54] MANAGING SYSTEM FOR CONSTRUCTION VEHICLES

[75] Inventor: Satoru Koyanagi, Kanagawa, Japan

[73] Assignee: Kabushiki Kaisha Komatsu Seisakusho, Japan

[21] Appl. No.: 842,389

[22] PCT Filed: Oct. 2, 1990

[86] PCT No.: PCT/JP90/01271

§ 371 Date: Mar. 31, 1992

§ 102(e) Date: Mar. 31, 1992

[87] PCT Pub. No.: WO91/05319

PCT Pub. Date: Apr. 18, 1991

[30] Foreign Application Priority Data

Oct. 2, 1989 [JP] Japan ................. 1-255247
Dec. 27, 1989 [JP] Japan ................. 1-336695
Feb. 19, 1990 [JP] Japan ................. 2-036242

[51] Int. Cl.$^5$ .............. G01G 19/10; G01G 19/40; G06F 15/48
[52] U.S. Cl. .............. 177/141; 177/25.14; 364/424.04
[58] Field of Search ............... 177/141, 25.14

[56] References Cited

U.S. PATENT DOCUMENTS

| 4,739,482 | 4/1988 | Wrigge ............... 364/424.03 |
| 4,884,054 | 11/1989 | Moon, Sr. ............ 364/424.03 X |
| 4,933,852 | 6/1990 | Lemelson ............ 364/424.03 |
| 5,046,007 | 9/1991 | McCrery et al. ....... 364/424.03 X |

FOREIGN PATENT DOCUMENTS

| 584206 | 5/1989 | Australia . |
| 610927 | 5/1991 | Australia . |
| 611636 | 6/1991 | Australia . |
| 0172553 | 2/1986 | European Pat. Off. . |
| 56-118197 | 9/1981 | Japan . |
| 56-118198 | 9/1981 | Japan . |
| 61-67199 | 4/1986 | Japan . |
| 61-67200 | 4/1986 | Japan . |

Primary Examiner—George H. Miller, Jr.
Attorney, Agent, or Firm—Ronald P. Kananen

[57] ABSTRACT

A managing system for a construction vehicle which has for its object to enable management of the vehicle relating to pre-operation checking, maintenance and summary of work load, etc to be conducted easily and quickly. This managing system comprises a vehicle control monitor (7) for inputting and recording information necessary for management of the vehicle from a plurality of information sources, a non-contact type recording card (27) for recording the information recorded in the vehicle control monitor (7), a card reader/writer (40) for reading out the information recorded in the recording card (27), and a printer (42) and a personal computer (43) for compiling management ledgers and displaying data on the basis of the information read out by the card reader/writer.

7 Claims, 3 Drawing Sheets

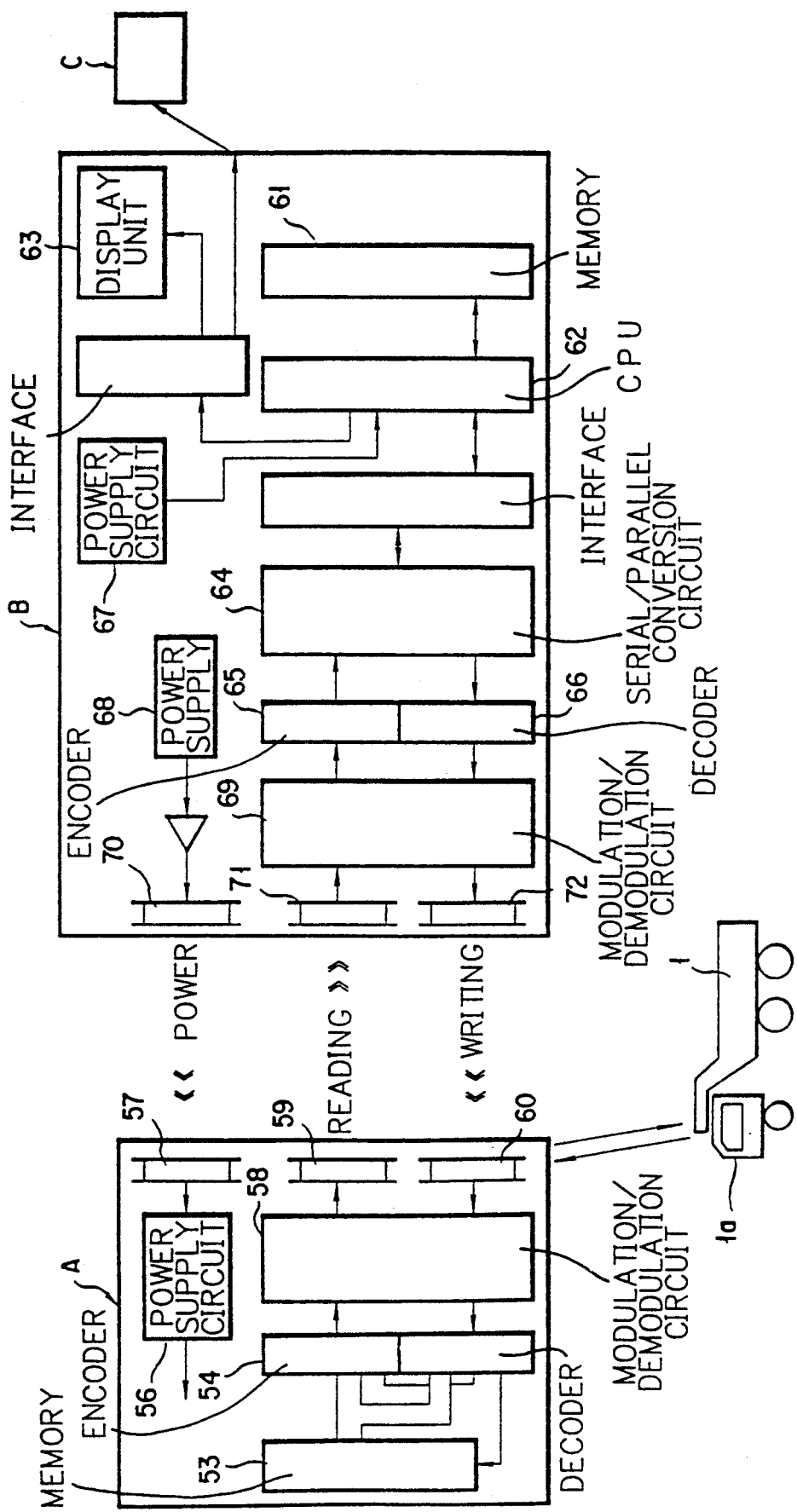

MANAGING SYSTEM FOR CONSTRUCTION VEHICLES

TECHNICAL FIELD OF THE INVENTION

This invention relates to a managing system for construction vehicles such as dump trucks, bulldozers, and the like.

BACKGROUND ART OF THE INVENTION

Since construction vehicles are in most cases operated under severe conditions, it is necessary to carry out pre-operation checking, that is, checks and inspection for the amount of fluid and liquid filled in every part after the start of engines at the commencement of operations. Further, since construction vehicles get out of order or are damaged frequently, it is essential to carry out incessant maintenance and repairs.

Further, in dump trucks, the total weight of earth and sand carried by each truck per day corresponds to the daily volume of work done, and therefore it is important to measure the total weight of earth and sand carried by each of them per day accurately.

Firstly, it the pre-operation checking, it has previously been made by the driver of each truck by observing an electronic display unit to check whether the quantities of brake fluid, engine oil, hydraulic fluid, transmission oil, retarder fluid, radiator liquid and battery liquid are normal or abnormal.

Such an electronic display meter serves to display only normality and abnormality and cannot record the result of pre-operation checking. Therefore, if it is desired to record them, it is necessary to resort to human work, which is troublesome. Further, to summarize the result of pre-operation checks thus recorded, it is necessary to carry out the work while checking the record, which operation is very troublesome.

Further, in the respect of maintenance and repairs, it is seldom that maintenance control data on individual construction vehicles are recorded scrupulously. In particular, since construction vehicles are expensive, they are in most cases not owned by individual users, but hired from rental companies therefore it has been difficult to carry out maintenance and repair suitable for individual construction vehicles.

Further, the measurement of the total weight of earth and sand carried by each truck per day has heretofore been made by detecting the pressures in suspension cylinders of each dump truck, computing by means of a microcomputer the weight of earth and sand loaded thereon on the basis of the detected pressures, and printing out by means of a printer the total weight of earth and sand transported by each truck per day on the basis of the computed weight of them.

On the other hand, since dump trucks for construction work weigh several tons and carry several ten tons of earth and sand, their engines consume great quantities of fuel, and also the fuel consumption varies largely with the driving techniques of individual drivers. It is therefore important to learn the amount of fuel consumed by the engine, that is, the fuel consumption per unit time. For this purpose, it has heretofore been made by finding amount of fuel consumption after the previous time when the fuel tank is filled with fuel fully from the amount of fuel supplied into the tank, thereby finding the fuel consumption per unit time.

To find the weight of earth and sand carried by each truck per day according to the aforementioned conventional method of measurement, it is necessary to sum up the computed weight of earth and sand loaded on each truck by human work and write the sum of the weight of the load carried in a management ledger, which is very troublesome. Further, the conventional method of finding the fuel consumption per unit time is also very worrisome.

SUMMARY OF THE INVENTION

The present invention has been made in view of the above-mentioned circumstances in the prior art, and has for its object to provide a managing system for a construction machine wherein results of pre-operation checking are recorded and summarized in a non-contact type recording card to simplify pre-operation checking work.

A second object of the present invention is to provide a management system for a construction vehicle wherein necessary data are recorded by a reader-writer, in noncontact condition, in a memory of an I.D. tag attached to the construction machine, and also that such data are read out from the memory and displayed by the reader/writer, so that the history of the construction machine in the past can be learnt easily and quickly.

Further, a third object of the present invention is to provide a managing system for a construction vehicle wherein a non-contact type recording card is inserted into a vehicle control monitor and then inserted into the equipment to conduct easily and quickly the operations of recording and summing up the total weight of earth and sand carried by each vehicle per day, the fuel consumption per unit time, the distance travelled, the vehicle travelling speed, and the working hours.

To achieve the above-mentioned objects, according to a first aspect of the present invention, there is provided a managing system for a construction vehicle comprising means for inputting and recording information necessary for the management of the vehicle from a plurality of information sources; a non-contact and non-terminal type recording card for recording the information recorded in the information inputting and recording means, an equipment for reading out the information recorded in the recording card, and an equipment for compiling a management ledger on the basis of the information read out from the recording card.

According to a second aspect of the present invention, there is provided a managing system for a construction vehicle as set forth in the above-mentioned first aspect, characterized in that the above-mentioned plurality of information sources are sensors attached to a brake fluid meter, an engine oil meter, a hydraulic fluid meter, a transmission oil meter, a retarder fluid meter, a radiator water level gauge, and a battery liquid meter, respectively, and signals transmitted by these sensors are inputted together with a start signal from an engine starting switch, a turn-on signal from a pre-operation checking switch, and a vehicle travelling signal from a shift lever into a vehicle control monitor serving as the above-mentioned information inputting and recording means.

Further, according to a third aspect of the present invention, there is provided a managing system for a construction vehicle as set forth in the above-mentioned first aspect, characterized in that the above-mentioned information inputting and recording means comprises a non-contact type I.D. tag having a non-volatile memory for recording data concerning maintenance of the vehicle such as, for example, the date of manufacture of the vehicle, the vehicle number, the places of failure and damage and the content of repairs in the past, principal times of auxiary equipment mounted on the vehicle, and so forth, the data being recorded by making use of another reader/writer, wherein the data recorded in the memory of the I.D. tag can be read out by making use of the reader/writer and displayed.

Still further, according to a fourth aspect of the present invention, there is provided a managing system for a construction vehicle as set forth in the above-mentioned second aspect, characterized in that the information inputted to the above-mentioned vehicle control monitor further include the pressures in suspension cylinders detected by pressure sensors attached to pressure chambers of the front and rear suspension cylinders mounted on the left and right sides of the vehicle, the weight of cargo loaded which is detected by a vessel raising/lowering sensor, the cargo unloading time and the kind of cargo which are inputted by means of ten-key, the flow-rate of fuel detected by sensors attached to fuel flow meters provided in a fuel supply system of the engine, the number of revolutions of an output shaft of a transmission gear detected by a rotational speed sensor, the working hours measured by a built-in timer and recorded in the vehicle control monitor, and the operator's cord, the date of manufacture of the vehicle, and the vehicle number, etc inputted using the ten-key.

According to the present invention incorporating the above-mentioned aspects, only by inserting the non contact type recording card into the information inputting and recording means, information necessary for the management of the vehicle can be recorded or read out, displayed and summed up, and therefore, the operations of management of construction vehicle which have heretofore been troublesome can be carried out extremely easily and quickly.

The above-mentioned and other objects, aspects and advantages of the present invention will become apparent to those skilled in the art by making reference to the following detailed description and the accompanying drawings in which a preferred embodiment incorporating the principles of the present invention is shown as an example only.

BRIEF DESCRIPTION OF THE DRAWINGS

FIG. 3 is an overall configurational explanatory view showing a second embodiment of the present invention.

DETAILED DESCRIPTION OF PREFERRED EMBODIMENTS

Preferred embodiments of the present invention will now be described in detail below with reference to the accompanying drawings.

Figure 1:
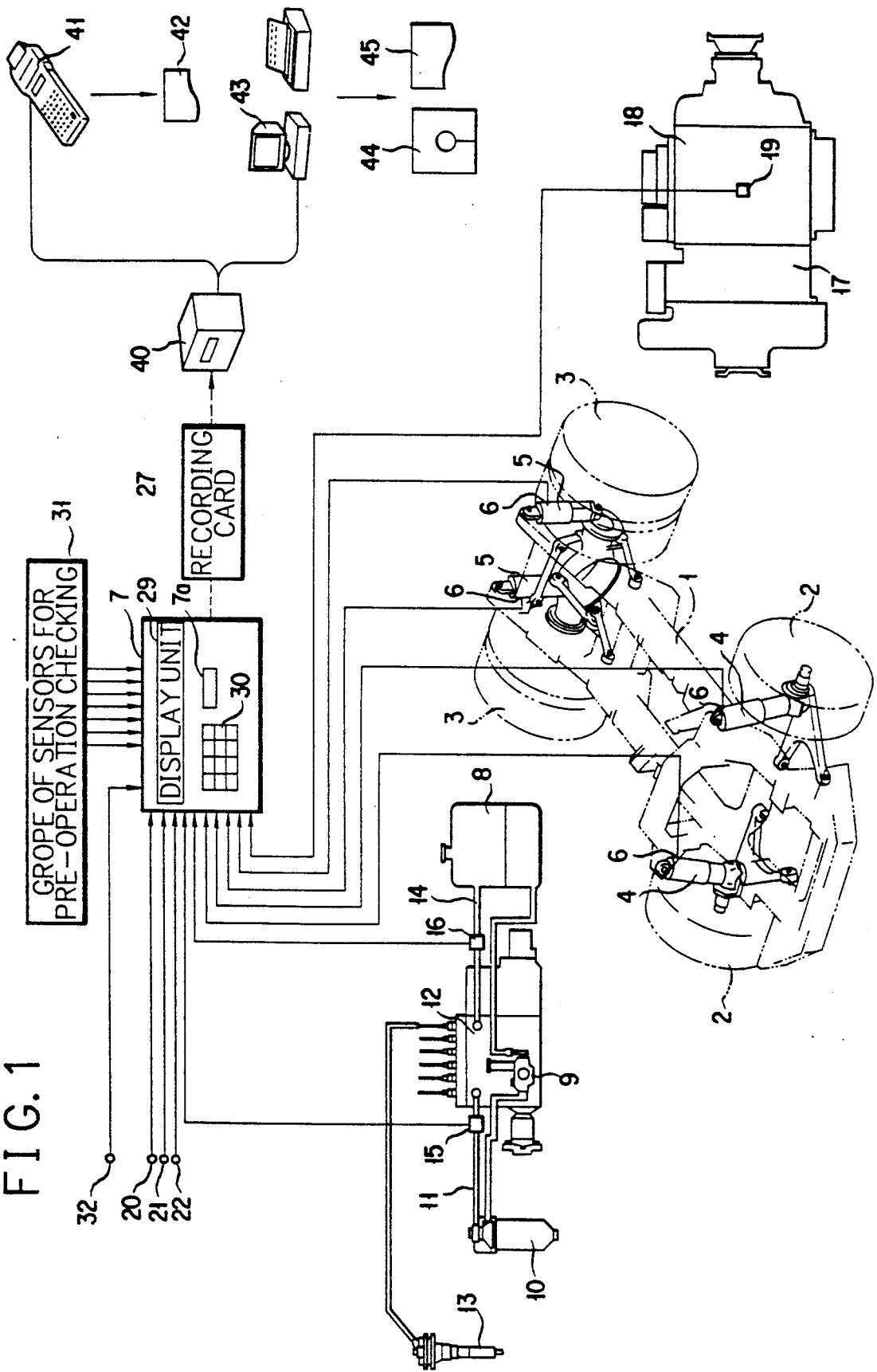
FIG. 1 is an overall configurational explanatory view showing a first embodiment of the present invention.

First of all, a first embodiment of the present invention comprises, as shown in FIG. 1, pressure sensors 6 attached to front suspension cylinders 4 which support front wheels 2 on a vehicle body 1, and pressure sensors 6 attached to rear suspension cylinders 5 which support rear wheels 3 on the vehicle body, the arrangement being made such that the pressure in each of the suspension cylinders is detected by each of the pressure sensors 6, and the pressures thus detected are inputted to a vehicle control monitor 7 which serves as an information inputting and recording device.

The fuel stored in a fuel tank 8 is supplied under pressure through a fuel feed pump 9, a fuel filter 10, and a pipe 11 into a fuel injection pump 12, whereby it is injected through a fuel injection nozzle 13 into a combustion chamber of an engine, not shown. The fuel which becomes surplus in the fuel injection pump 12 is returned through a return pipe 14 into the fuel tank 8. The above-mentioned pipe 11 and return pipe 14 are provided with first and second fuel flow-rate sensors 15 and 16, and the fuel flow-rates detected by these sensors are inputted to the above-mentioned vehicle control monitor 7. (There is a case where measurement of the flow-rate of the return fuel is not necessary depending on the kind of the fuel injection pump. In such a case, the flow meter for return fuel flow is not used.)

The rotation of the output shaft is transmitted through a torque converter 17, a transmission gear 18, a propelling shaft and a differential gear, etc which are not shown, to the aforementioned rear wheels 3. A rotational speed sensor 19 is provided to detect the number of revolutions of the output shaft of the transmission gear 18, and the number of revolutions detected by the sensor 19 is inputted to the vehicle control monitor 7 to calculate the highest and lowest vehicle travelling speeds and the distance covered or travelled.

The above-mentioned vehicle control monitor 7 is inputted with vessel raising/lowering signals from a vessel raising/lower sensor 20 (when vessel raising and lowering signals are transmitted by the sensor, the earth and sand unloading time is stored through a built-in timer in the vehicle control monitor, a speed-stage signal from a shift lever sensor 21, and pre-operation checking signals transmitted by pre-operation checking sensors when a pre-operation checking switch 22 is turned on.

The signals indicative of results of pre-operation checking include those from a group 31 of sensors for pre-operation checking, which consists of sensors attached to a brake fluid meter, an engine oil meter, a transmission oil meter, a retarder fluid meter, a radiator water level gauge, and a battery liquid meter, and include in addition thereto a start signal from an engine starting switch 32, a turn-on signal from the pre-operation checking switch 22, and a vehicle travelling signal from the shift lever sensor 21.

Figure 2:
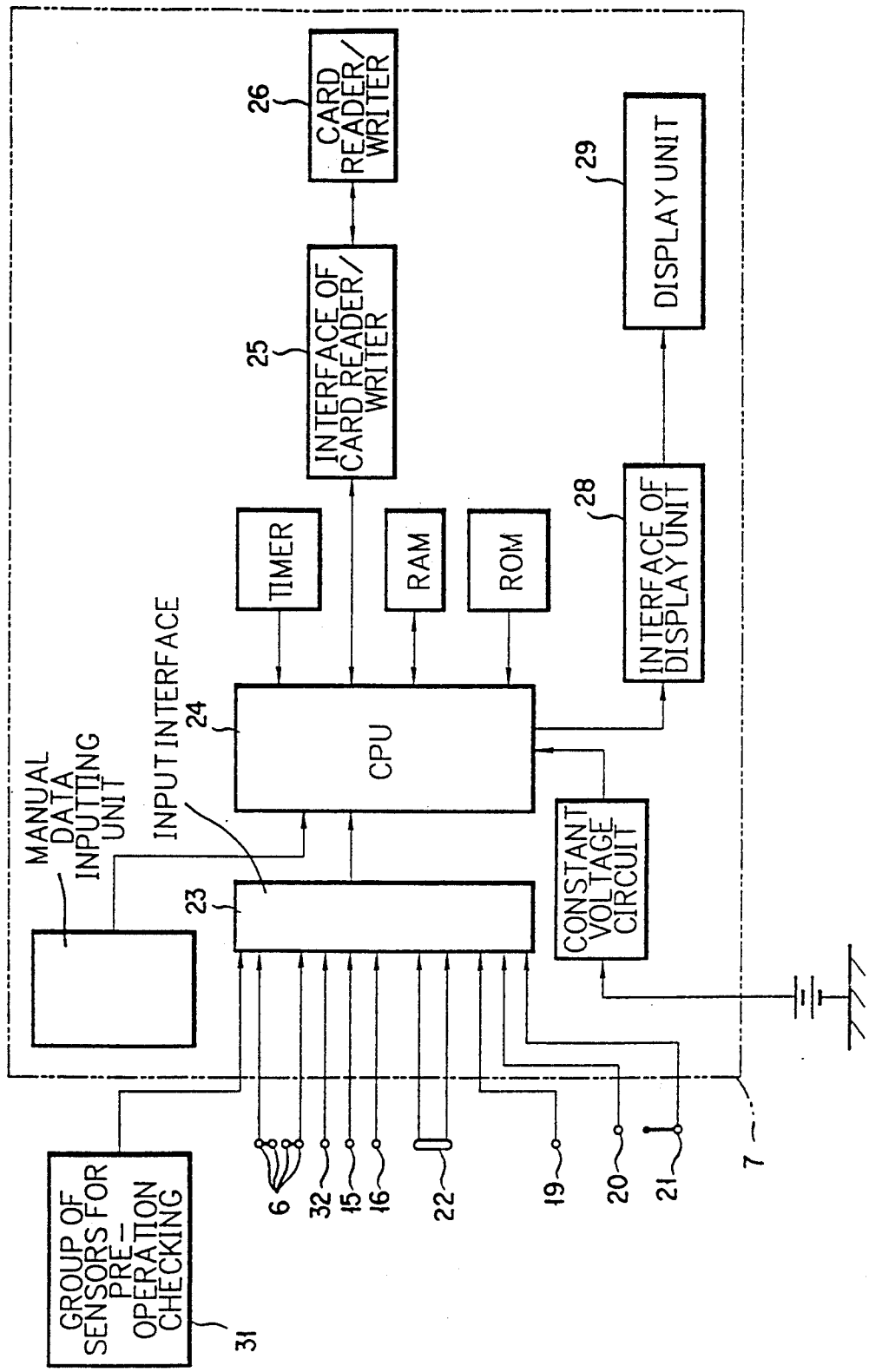
FIG. 2 is a configurational explanatory view of an information inputting and recording device.

In the above-mentioned vehicle control monitor 7, as shown in FIG. 2, the signals inputted thereto are sent through an input interface 23 to an arithmetic circuit 24 whereby the weight of earth and sand loaded in the vessel, the vehicle travelling speed, the highest and the lowest vehicle travelling speeds, the distance travelled, the fuel consumption per unit time, and the working hours, etc are computed, and the results of computation are sent through an interface 25 of card reader/writer to a card reader/writer 26, and then recorded in a non-contact type recording card 27. Each time the power supply switch is turned on, signals indicative of the results of the pre-operation checking which indicate normality and abnormality are inputted to the vehicle control monitor 7. Then, the present conditions, for example, the quantities of water in the radiator, fuel and lubricating oils, etc are displayed through an interface 28 of display unit by display unit 29, and then recorded in the same or separate non-contact type recording card, and further the kind of the cargo loaded on the vehicle, the time of replacement of oil and grease and filters are inputted using ten-key 30, and as occasion demands an instruction for replacement is displayed on the display unit 29, and then recorded in the same or separate non-contact type recording card.

The above-mentioned recording card 27 is inserted into a card reader/writer 40 to read out the information recorded therein, and then the information thus read out is inputted to a hand-held computer 41, from which it is outputted to a printer 42, or it is inputted to a personal computer 43, from which it is stored in a floppy disc 44 and/or it is recorded in a document 45.

Next, one example of the computation of the weight of the cargo loaded in the vessel will be described.

When a vessel lowering signal is inputted to the arithmetic circuit 24 after vessel raising and lowering signals are inputted thereto, the sum of the loads applied to the suspension cylinders is computed on the basis of the pressures detected by the pressure sensors 6, and then the difference between the sum of the loads, and the tare weight of the vehicle body stored previously or computed when the vehicle is empty is computed as the weight of the cargo loaded.

In the next place, one example of operation or computation of the fuel consumption per unit time is described.

The flow-rate of fuel detected by the second fuel flow meter 16 is subtracted from that detected by the first fuel flow meter 15 to calculate the amount of fuel injected into the combustion cylinder of the engine, and then the fuel consumption per unit time is calculated on the basis of the amount of fuel injection and the operating time.

In the next place, the maintenance control on the construction equipment which is a second embodiment of the present invention will be described with reference to FIG. 3.

As shown in FIG. 3, an I.D. tag "A" is attached to a driver's cabin 1a or the like of the construction vehicle.

I.D. tag A comprises a non-volatile memory ($E^2$ memory) 53, an encoder 54, a decoder 55, antenna (coil) 57 for power supply which is connected with a power supply circuit, antenna (coil) 59 for reading which is connected with a modulation/demodulation circuit 58, and an antenna (coil) 60 for writing. The I.D. tag A is of a non-contact type wherein data can be written thereto and read out therefrom by means of a reader/writer B in non-contact condition.

The above-mentioned reader/writer B comprises a memory 61, CPU 62, a display unit 63, a serial-parallel conversion circuit 64, an encoder 65, a decoder 66, a power supply circuit 67, a power supply circuit 68, a modulation/demodulation circuit 69, an antenna (coil) 70 for power supply, an antenna (coil) 71 for reading, and an antenna (coil) 72 for writing. The antenna 70 for power supply is electromagnetically coupled with the antenna 57 for power supply of I.D. tag A so that the latter can be supplied with electric power. Further, by electromagnetically coupling the antenna 71 for reading with the antenna 59 for reading, and electromagnetically coupling the antenna 72 for writing with the antenna 60 for writing, writing and reading-out of data can be made between the reader/writer B and the I.D. tag A.

Further, the reader/writer B comprises a data communication port which can be connected with a printer or a personal computer C so that necessary data can be printed out.

And, the date of manufacturing and the serial number of the construction vehicle are recorded in the memory 53 of the I.D. tag A by the reader/writer B at the manufacturing factory.

In the event of failure or damage of this construction machine, the place of failure or damage, and the content of repairs are recorded by the service engineer or the repairman in the memory 53 of the I.D. tag A using the reader/writer B on each occasion, and further when an auxiliary equipment is mounted on the vehicle by option, the principal items of the equipment are recorded in the memory 53 of the I.D. tag A by the reader/writer B on each occasion.

Because the memory 53 is of non-volatile type, the data recorded in this memory 53 does not erase even if a power failure occurs.

The data thus recorded can be read out as occasion demands by means of the reader/writer B and displayed by the display unit, and also printed out by the printer C, and therefore the record of the relevant construction vehicle in the past can be readily learned so that the management of maintenance and repairs, etc can be carried out easily.

The foregoing description is merely illustrative of preferred embodiments of the present invention, and the scope of the present invention is not limited thereto. Many changes and modifications of the present invention will readily occur to those skilled in the art without departing from the scope of the present invention.

What is claimed is:

1. A managing system for a construction vehicle having front and rear wheels for which hydro-pneumatic suspension cylinders are provided, comprising:

a set of sensors including sensors operably attached to a brake fluid meter, an engine oil meter, a hydraulic fluid meter, a transmission oil meter, a retarder fluid meter, a radiator water level gauge and a battery liquid meter, respectively;

a vehicle travelling speed sensor unit for detecting a travelling speed, a highest and lowest vehicle travelling speeds and a distance travelled;

a vehicle control monitor, including: means for computing the weight of load according to respective pressures applied to the hydro-pneumatic suspension cylinders; means for recording an unloading time, the weight of load and the kind of load according to a combination of a vessel raising/lowering signal and a signal of a kind of load inputted by means of ten-key; means for computing fuel consumption per unit time according to a flow rate of fuel in a fuel supply line of an engine; means for computing the vehicle travelling speed, the highest and the lowest vehicle travelling speeds and the distance travelled according to an output signal from said vehicle travelling speed sensor unit; means for recording the results of a pre-operation check of the vehicle according to output signals from said sensors attached to the brake fluid meter, the engine oil meter, the hydraulic operating fluid meter, the transmission oil meter, the retarder fluid meter, the radiator water level gauge and the battery liquid meter, respectively; means for recording working hours measured by a built-in timer; and means for recording vehicle maintenance and descriptive data;

a non-contact type recording card for recording the information recorded in said vehicle control monitor;

means for reading out the information recorded in said recording card; and means for compiling a management ledger on the basis of the information read out from said recording card.

2. A managing system for a construction vehicle as claimed in claim 1, characterized in that said vehicle control monitor further includes an input interface through which information signals are inputted; an arithmetic circuit for, performing the calculations of said calculating means; and a display unit for displaying the results of said calculating and recording means.

3. A managing system for a construction vehicle as claimed in claim 1, characterized in that said vehicle control monitor comprises a non-contact type I.D. tag having a non-volatile memory for recording said maintenance and descriptive data of the vehicle, said data including the date of manufacture of the vehicle, a vehicle identification number, places of past failure and damage, content of repairs in the past, and principal items of auxiliary equipment mounted on the vehicle, the data being recorded by making use of a reader/writer, wherein the data recorded in the memory of the I.D. tag can be read and displayed by making use of the reader/writer.

4. A managing system for a construction vehicle as claimed in claim 3 characterized in that said reader/writer includes a memory for recording relevant information; a CPU for computing and checking the information; a display unit for displaying the results of computation and checking made by the CPU through an interface; a serial-parallel conversion circuit; an encoder, a decoder, a power supply circuit; a modulation/demodulation circuit; an antenna for power supply; an antenna for reading; and an antenna for writing.

5. A managing system for a construction vehicle as claimed in claim 4, characterized in that said reader/writer includes a data transmission port which can be connected with a printer or a personal computer so that necessary data can be printed out.

6. A managing system for a construction vehicle as claimed in claim 3 characterized in that said I.D. tag includes a memory for recording management information through the intermediary of said reader/writer; an encoder; a decoder; an antenna for power supply connected with a power supply circuit; an antenna for reading connected with a modulation/demodulation circuit, and an antenna for writing.

7. A managing system for a construction vehicle having front and rear wheels for which hydro-pneumatic suspension cylinders are provided, comprising:

pressure sensor means for detecting respective pressures in the hydro-pneumatic suspension cylinders;

a set of sensors including sensors operably attached to a brake fluid meter, an engine oil meter, a hydraulic operating fluid meter, a transmission oil meter, a retarder fluid meter, a radiator water level gauge and a battery liquid meter, respectively;

a fuel flow rate sensor for detecting a flow rate of fuel in a fuel supply line of an engine of the vehicle;

a vehicle travelling speed sensor unit;

a vehicle control monitor, including: means for calculating and recording a weight of load according to an output signal from said pressure sensor means; means for recording a result of a pre-operation check of the vehicle according to output signals from said sensors attached to the brake fluid meter, the engine oil meter, the hydraulic operating fluid meter, the transmission oil meter, the retarder fluid meter, the radiator water level gauge and the battery liquid meter, respectively; means for calculating and recording fuel consumption per unit time according to an output signal from said fuel flow rate sensor; means for calculating and recording the vehicle travelling speed, the highest and lowest vehicle travelling speeds and the distance travelled according to an output signal from said vehicle travelling speed sensor unit; means for recording vehicle maintenance and descriptive data;

a non-contact type recording card means for recording the information recorded in said vehicle control monitor;

means for reading the information recorded in said recording card means; and means for compiling a management ledger on the basis of the information read from said recording card means.

* * * * *